United States Patent [19]
Plumley

[11] Patent Number: 5,507,320
[45] Date of Patent: Apr. 16, 1996

[54] HOSE FOR AN AUTOMOBILE FUEL LINE

[75] Inventor: Stephen Plumley, Paris, Tenn.

[73] Assignee: Plumley Companies, Inc., Paris, Tenn.

[21] Appl. No.: 322,471

[22] Filed: Oct. 14, 1994

[51] Int. Cl.⁶ .................................................... F16L 11/04
[52] U.S. Cl. ........................ 138/126; 138/127; 138/137; 138/141; 138/123; 428/36.2
[58] Field of Search .................... 138/123–127, 138/137, 141, 145, 146, DIG. 3; 428/36.2, 36.8

[56] References Cited

U.S. PATENT DOCUMENTS

| | | | |
|---|---|---|---|
| Re. 32,230 | 8/1986 | Satoh et al. | 138/126 |
| 3,910,449 | 10/1975 | Gezari | 220/9 F |
| 4,041,207 | 8/1977 | Takada et al. | 428/421 |
| 4,330,017 | 5/1982 | Satoh et al. | 138/126 |
| 4,444,403 | 4/1984 | Morris | 277/228 |
| 4,634,615 | 1/1987 | Versteegh et al. | 428/36 |
| 4,685,090 | 8/1987 | Krevor | 367/20 |
| 4,800,109 | 1/1989 | Washizu | 428/34.9 |
| 4,914,752 | 4/1990 | Hinson et al. | 2/2 |
| 4,973,627 | 11/1990 | Mitchell | 525/211 |
| 5,136,877 | 8/1992 | Sharp | 73/49.2 |
| 5,169,716 | 12/1992 | Croft et al. | 428/379 |
| 5,225,504 | 7/1993 | Tatsu et al. | 526/206 |
| 5,242,836 | 9/1993 | Ruse | 436/178 |
| 5,284,184 | 2/1994 | Noone et al. | 138/121 |
| 5,320,888 | 6/1994 | Stevens | 428/36.2 |
| 5,374,484 | 12/1994 | Kasahara et al. | 428/421 |

Primary Examiner—David Scherbel
Assistant Examiner—Patrick F. Brinson
Attorney, Agent, or Firm—Longacre & White

[57] ABSTRACT

A laminated hose is present which is suitable for a fuel conducting hose or other hose, or diaphragm, used for example in an automotive vehicle, which structure is required to have excellent heat resistance and gasoline permeation resistance while maintaining suitable properties of bonding and flexibility. The hose is constituted by an inner veneer layer of fluorovinylidene-hexafluoropropylene backed by a thin layer of Teflon. These layer are then reinforced by an elastomeric tie layer, a reinforcing layer and an elastomeric cover.

7 Claims, 1 Drawing Sheet

HOSE FOR AN AUTOMOBILE FUEL LINE

FIELD OF THE INVENTION

The present invention relates in general to a laminated rubber structure and in particular to such a rubber or article suitable for a fuel conducting hose or other hose, or diaphragm, used for example in an automotive vehicle, which structure is required to have excellent heat resistance and gasoline permeation resistance while maintaining suitable properties of interlayer bonding and flexibility.

DESCRIPTION OF RELATED ART

There has conventionally been used a multi-layered or laminated rubber structure as a fuel transporting hose for an automobile. For example, there is known a fuel transporting hose constituted by three layers superimposed on each other, that is, a heat resistant and gasoline resistant inner tube, a weather resistant outer tube, and a reinforcing layer interposed between the inner and outer tubes.

In conventional automotive fuel hoses, usually nitrile rubber (acrylonitrile-butadiene rubber) is utilized as a fundamental material of an innermost layer of the hoses and chloroprene rubber as a covering material.

Recently, automobile fuel systems have become considerably more complicated due to the enactment of various measures to achieve satisfactory control of exhaust emission. In many recent automobile models, gasoline flowing through the fuel lines is liable to undergo a considerable rise in temperature by the influence of exhaust emission control means and fuel injection systems. There is therefore a strong possibility that the heated gasoline is partially oxidized to form "sour gasoline" which is highly erosive to many organic materials including synthetic rubbers. In fuel injected automobiles, an erosive action of sour gasoline on the material of the fuel hose is further promoted by the pressure applied to the fuel. Such systems result in high permeation rates which increase emissions.

When such change in the condition of the fuel system is taken into consideration, nitrile rubber as the fuel hose material is no longer satisfactory in its heat resistance and oxidation resistance. In other words, there arises a problem that automotive fuel hoses which employ nitrile rubber as the fundamental material have a short service life. Since deterioration of the fuel hose is liable to result in fuel leakage and hence constitute a serious danger, the need exists for a fuel hose having sufficient resistance to sour gasoline, and permeation associated therewith.

Attention has been given to relatively recently developed synthetic rubbers, particularly to fluorine rubbers (fluorine-containing hydrocarbon elastomers) and epichlorohydrin rubbers as fuel hose materials superior to nitrile rubber in heat and solvent resistance. However, practical applications of these materials have several drawbacks.

Fluorine rubber is excellent in heat resistance and solvent resistance and has been regarded as sufficiently resistant even to sour gasoline. However, since fluorine rubber has no double bond in its polymer, it does not bond easily to other materials and is not satisfactory in its resistance to cold. Thus, during use particularly in extreme conditions, hoses employing a fluoro-rubber at the inner layer may peel or separate form the outer layer.

Epichlorohydrin rubber is excellent in its resistance to cold but is rather poor in its resistance to oxidized fuel, particularly in a heated or pressurized state. Therefore, it is impermissible to use epichlorohydrin rubber as the material for an innermost layer of an automotive fuel hose.

Some synthetic resins other than synthetic rubbers have also been employed for conventional organic liquids. For instance, U.S. Pat. No. 5,170,011 to Martucci discloses a hose comprising a tube of a polymeric fluorocarbon material such as nylon or Teflon as the innermost layer with a tubular rubber layer of larger thickness covering the outside of the resin tube. However, nylon and Teflon do not bond well to the outer rubber layer, and lack sufficient flexibility since neither nylon nor Teflon exhibit rubbery or elastomeric behavior. It is therefore not suitable to use this hose as an automotive fuel hose. If so, it would be necessary to employ special clamps and bandage tubes for the purpose of precluding the occurrence of fuel leaks during long operation of the fuel system, because this hose is inferior to true rubber hoses in rubbery resiliency, flexibility, and bendability. Moreover, this hose will lack durability due to the separation tendency of its rubber covering layer from the synthetic resin tube.

Therefore, the need exists for a fuel hose which exhibits ultra low permeation rates while maintaining satisfactory flexibility and durability when exposed to extreme temperature, pressure and bending conditions.

SUMMARY OF THE INVENTION

It the object of the instant invention to provide a material for handling hydrocarbon fuels, and in particular a fuel hose arrangement, which does not suffer from the drawbacks present in the prior art.

The invention provides a material for a storage tank or fuel line suitable for gasoline handling systems where ultra low permeation rates are required. The invention provides a fuel hose which provides a reduction in emissions rates in the range of 99% when compared to conventional fluoroelastomer hoses. These superior rates are true for unleaded gasolines as well as reformulated gasolines (ethers, alcohols, etc.).

The invention provides a laminated rubber structure including a layer formed of fluororubber and a layer formed of Teflon (tetraflouroethylene) superposed on the fluororubber layer, which structure exhibits excellent interlayer bonding characteristics for a long period of use while providing ultra low permeation rates and excellent bending properties.

In the preferred embodiment, the material or fuel hose of the invention consists of a veneer of Viton (a copolymer of fluorovinylidene and hexafluoropropylene) backed by a thin Teflon wrap. The Teflon is then covered with a secondary organic rubber compound, reinforced with a synthetic fabric, and covered with an additional organic rubber compound to complete the entire hose construction of the preferred embodiment. It is noted that various changes in form and substance may be made without departing from the spirit and scope of the invention.

The following is a description of the invention which is not intended to limit the scope of the invention but rather describe the preferred embodiment thereof. The description includes claims and a drawing forming parts thereof.

DETAILED DESCRIPTION OF THE PREFERRED EMBODIMENT

Figure 1:
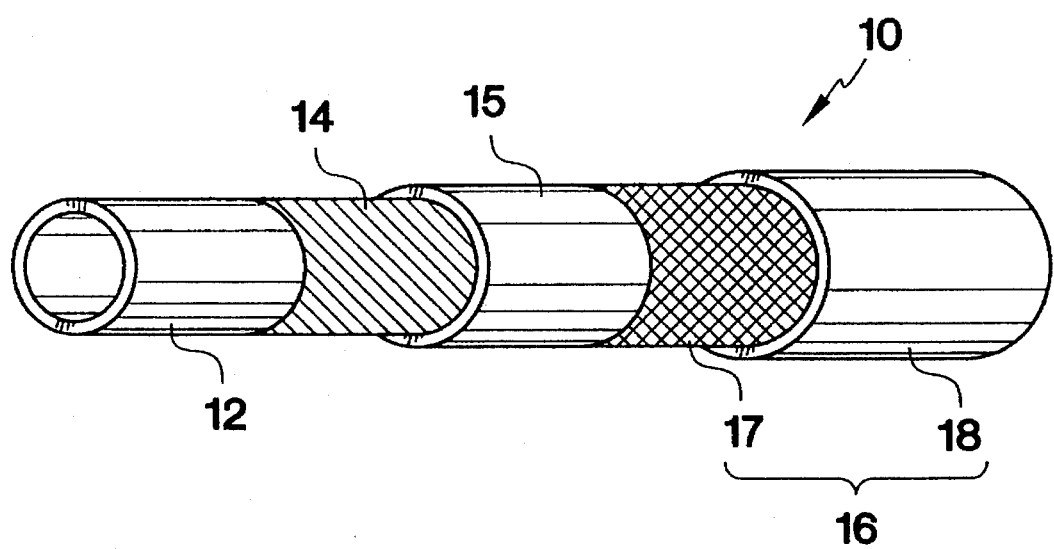
FIG. 1 is a view illustrating the construction of a fuel hose shown in perspective cross-sectional view.

The above and optional features and advantages of the present invention will be better understood by reading the following detailed description of the invention. The laminated rubber structure according to the present invention is by no means limited to a specific shape but may take various shapes in accordance with the desired application.

With reference to FIG. 1 there is shown a fuel transporting hose 10 in a multi-layered arrangement comprising an inner layer 12 in the form of a veneer of a copolymer of fluorovinylidene and hexafluoropropylene, and in particular Viton VTX7175 by DuPont. This fluoroelastomer layer 12 comprises approximately 70% fluorine. It is noted that Viton exhibits improved gasoline permeation resistance in accordance with the primary objective of the invention as discussed in U.S. Pat. No. 3,687,169 to Reynard.

Backing the inner layer 12 is a Teflon wrap 14 having an approximate thickness of 0.02 to 0.05 mm. The Teflon (tetraflourethylene) wrap 14 provides excellent bonding properties with the fluoroelastomer layer 12, and thus constitutes a substantial improvement over the art of record. Due to the thickness of the Teflon layer 14, flexibility and bending properties of the hose construction are not sacrificed, but instead the Teflon wrap 14 serves to increase the permeation resistance provided by the fluoroelastomer layer 12. Further material benefits are set forth in U.S. Pat. No. 5,284,184 to Noone et al. which is incorporated herein by reference.

The Teflon layer 14 is then covered with a secondary organic rubber compound in the form of an elastomeric tie layer 15. The tie layer 15 is formed of a suitable elastomer possessing requisite flexibility and durability to separate the Teflon layer 14 from any additional layer provided for reinforcement and support.

The outer tube 16 is constituted by a reinforcing layer 17, which may be a single or double layer of braided synthetic fibers such as braided 12-Nylon fibers, and a seamless protective cover layer 18 of polyurethane which is formed on the reinforcing layer 17.

The elastomeric tie layer 15 is thus covered intimately with a tubular reinforcing layer 17 of a fibrous material. Since the role of this reinforcing layer 17 is to afford sufficient physical strength and heat resistance to the finished hose, it is preferable that this layer 17 takes the form of a braid of glass fiber which is highly resistant to heat, cotton fiber or a strong and relatively heat-resistant synthetic fiber such as polyester fiber, polyamide fiber or partially acetal-formed polyvinyl alcohol fiber (vinylon fiber).

As previously stated, attempts have been made to utilize either fluorine rubber or Teflon to achieve low permeation rates; however, these arrangement have suffered from numerous drawbacks caused by the bonding characteristics of these materials. Therefore, the invention provides a substantial improvement over the bonding arrangements of the prior art.

Specifically, the nonelastic fluoroplastic is treated to promote adhesion,, preferably by a corona discharge treatment. Moreover, the outer bonding jacket 15 adjacent to the Teflon layer 14 may be an elastomer copolymerized with a polar comonomer. Adhesion will be further positively induced via utilization of a peroxide vulcanization system.

Table I below sets forth the specific details of the subject formula for bonding the adjacent fluoroelastomer layer 12 and the elastomeric tie layer 15 to the Teflon layer 14 and embodies the preferred embodiment of the invention. The beneficial features of the chemistry set forth below are fivefold: an organic peroxide, an epoxy compound, a cyanate compound, and a complex decene compound. It is noted that the elements listed in Table I are set forth in parts per hundred rubber.

TABLE I

| (parts per hundred rubber) | |
|---|---|
| Medium ACN NBR | 100.0 |
| Zinc Oxide | 5.0 |
| Stearic Acid | 2.0 |
| Paraffin | 1.0 |
| Fatty Acid Ester | 1.0 |
| Carbon Black | 55.0 |
| Dioctyl Phthalate | 5.0 |
| Octylated Phenylamine | 1.0 |
| Traillyl Isocyanurate | 1.0 |
| 2,5-Dimethyl-2,5-bis(t-butylperoxy) hexane | 0.7 |
| Chloromethyl oxirane | 2.0 |
| Magnesium oxide | 20.0 |
| 1,8-Diazabicyclo [-5.4.0] undec-7-ene, 98% | 1.0 |

Table I above provides an organic peroxide in the form of 2, 5-Dimethyl-2, 5-bis(t-butylperoxy) hexane. An epoxy compound is provided in the form of Chloromethyl oxirane. Traillyl Isocyanurate provides the cyanate compound of the above formula. The complex decene compound of the invention is 1, 8-Diazabicyclo [−5.4.0] undec-7-ene, 98%. It is noted that the above formula and specific ratios provided thereby sets forth only one formula to achieve the objects of the invention. Changes in form and detail may be made by those skilled in the art without departing from the spirit and scope embodied therein.

In the hose of FIG. 1, an outermost layer 18 of the fuel hose is a elastomeric protective layer of a synthetic rubber. The material of this layer 18 should be good at heat resistance, oil resistance, weather resistance and flame resistance. Accordingly, ethylene-acrylic rubber, chloroprene rubber or epichlorohydrin rubber is preferable as the material of layer 18.

From the foregoing, it is noted that the inner layer 12 comprising a veneer of Viton backed by a Teflon wrap 14 has been shown to reduce emissions in the range of 99% when compared with conventional fluoroelastomer hoses. This superior emission reduction rate is true for both unleaded gasolines and reformulated gasolines, i.e. ethers, alcohols, etc. Moreover, the fuel hose of the invention is suitable for internal combustion engines whether utilizing an electronic fuel injector or a traditional carburetor.

It is further noted that the structural arrangement of the invention provides a substantial improvement over the prior art arrangement having an inner lining solely comprised of fluororubber. The bonding properties exhibited by the arrangement of the invention permits a reduction in the individual thicknesses of each of the Viton and Teflon layers, while providing ultra low permeation rates.. Moreover, the individual thicknesses of the Viton and Teflon layers maintains a suitable flexibility without exhibiting the separating or peeling drawbacks exhibited by the prior art.

The invention provides a rubber laminate with improved heat resistance and permeation resistance. The Viton/Teflon arrangement of the invention is not intended to be limited to fuel hoses, but may be employed in all fuel handling systems, i.e. storage tanks, pumping arrangements, etc. as will be understood by those of skill in the art.

What is claimed is:

1. A laminated extruded material for containing a fuel, particularly a hydrocarbon fuel comprising:

an inner layer for contacting said fuel comprised of a fluorocarbon elastomer which is resistant to permeation of hydrocarbon fuels and;

an adjacent outer layer formed of tetraflouroethylene, said adjacent layer adhering to said inner layer, said adhesion of said adjacent layer tetraflouroethylene to said inner layer being enhanced by one of a group consisting of one or more of the following: an organic peroxide 2,5-Dimethyl-2, 5 -bis(t-butylperoxy) hexane; a cyanate compound, said cyanate compound being traillyl isocyanurate; an epoxy compound in the form of Cloromethyl oxirane; and, a complex decene compound, said complex decene compound being 1, 8-Diazabicyclo [.5.4.0] undec- 7-ene, 98%.

2. The hose according to claim 1, wherein said fluorocarbon elastomer comprises approximately 70% fluorine.

3. A hose for a fuel line comprising:

a two-ply tube constituted of an inner layer of a copolymer of hexafluoropropylene with vinylidene flouride which is resistant to permeation of hydrocarbon fuels and an outer layer formed of tetrafluoroethylene adjacent said inner layer; said outer layer adhering to said inner layer, said adhesion of said outer layer tetraflouroethylene to said inner layer being enhanced by one of a group consisting of one or more of the following: an organic peroxide 2,5-Dimethyl-2, 5-bis(t-butylperoxy) hexane; a cyanate compound, said cyanate compound being traillyl isocyanurate; an epoxy compound in the form of Cloromethyl oxirane; and, a complex decene compound, said complex decene compound being 1, 8-Diazabicyclo [.5.4.0] undec-7-ene, 98%;

a protective covering layer of a heat resistant fibrous material covering said two-ply tube.

4. The hose according to claim 3, wherein said inner layer comprises approximately 70% fluorine.

5. The hose according to claim 3, wherein said outer layer has a thickness of about 0.05 mm.

6. The hose according to claim 3, wherein said protective covering layer comprises:

a tubular reinforcing layer of a heat resistant fibrous material covering said two-ply tube; and a tubular protective layer of a synthetic rubber intimately covering said reinforcing layer.

7. The hose according to claim 6, further comprising an elastomeric tie layer provided between said two-ply tube and tubular reinforcing layer.

* * * * *